United States Patent [19]

Imai et al.

[11] Patent Number: 5,139,311
[45] Date of Patent: Aug. 18, 1992

[54] AUTOMOTIVE SEAT WITH BELT BUCKLE HOLDER

[75] Inventors: Shinobu Imai; Keiji Nakayama, both of Kanagawa, Japan

[73] Assignee: Ikeda Bussan Co., Ltd., Ayase, Japan

[21] Appl. No.: 612,456

[22] Filed: Nov. 14, 1990

[30] Foreign Application Priority Data

Nov. 28, 1989 [JP] Japan .................. 1-136799[U]

[51] Int. Cl.⁵ .................................................. B60R 22/00
[52] U.S. Cl. .................................................. 297/481
[58] Field of Search ........................ 297/481, 482, 191

[56] References Cited

U.S. PATENT DOCUMENTS

| | | | |
|---|---|---|---|
| 3,076,679 | 2/1963 | Lorber | 297/481 |
| 3,096,122 | 7/1963 | Connell | 297/481 |
| 4,560,203 | 12/1985 | Huber | 297/481 |
| 4,687,254 | 8/1987 | Baumert et al. | 297/481 |
| 4,702,519 | 10/1987 | Lobanoff | 297/191 X |
| 4,810,037 | 3/1989 | Takagi | 297/481 |

FOREIGN PATENT DOCUMENTS

| | | |
|---|---|---|
| 3439076-A | 4/1986 | Fed. Rep. of Germany . |
| 3439077-A | 5/1986 | Fed. Rep. of Germany . |
| 2214795A | 8/1989 | United Kingdom . |
| 2222940A | 3/1990 | United Kingdom . |

*Primary Examiner*—Peter R. Brown
*Attorney, Agent, or Firm*—Foley & Lardner

[57] ABSTRACT

An automotive seat having a seat belt buckle holder is disclosed, which includes a seatback part having a pad covered with an outer skin member, and a seat belt assembly having a belt equipped with a buckle. The pad is partially cut away to form a rectangular recess which is so sized as to accommodate the buckle. The outer skin member is cut in L-shape for providing the outer skin member with an openable part. The openable part is detachably fastened, by means of a fastener, to the pad.

10 Claims, 3 Drawing Sheets

FIG. 2
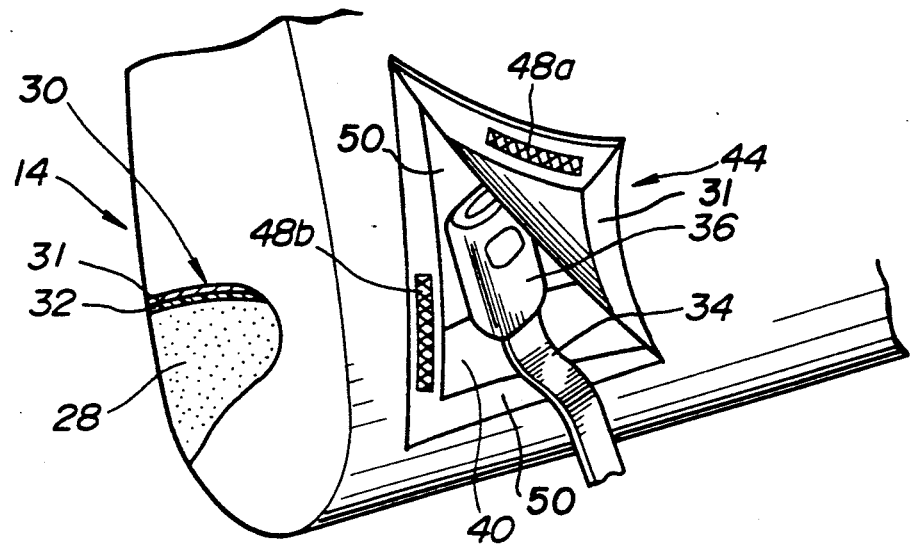
FIG. 3
FIG. 4
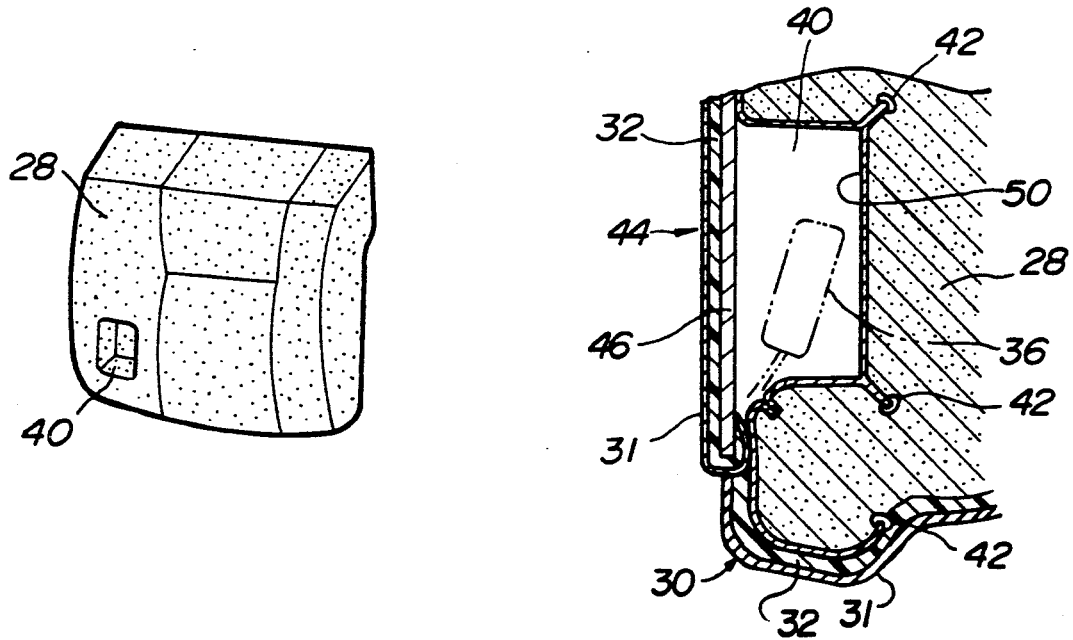

AUTOMOTIVE SEAT WITH BELT BUCKLE HOLDER

BACKGROUND OF THE INVENTION

1. Field of the Invention

The present invention relates in general to automotive seats, and more particularly to automotive rear seats of a type which has a seat belt buckle holder.

2. Description of the Prior Art

A seat belt has been used for protecting a seat occupant against the shock of vehicle collision. However, when a seat occupant is seated on a seat without using the seat belt, the seat belt, particularly, the buckle thereof, which is bulky in construction, becomes an obstacle to the seat occupant.

In order to clarify this drawback, one of conventional automotive seats of the above-mentioned type will be outlined with reference to FIG. 5 of the accompanying drawings.

In FIG. 5, designated by numeral 10 is an automotive rear seat which includes a seat cushion 12 and two abreast arranged seatbacks 14. The rear seat 10 illustrated has two sets of seat belt assemblies, each including a tongue-mounted belt part 16a and a buckle-mounted belt part 16b. Each belt part 16a or 16b has one end (not shown) fixed to a vehicle floor and comes out through the boundary portion between the seat cushion 12 and each seatback 14, as shown. The buckle 20 has a male member 22, and each seatback 14 has at its front lower portion a female member 24. The male and female members 22 and 24 are engageable with each other in a snap action manner. Thus, when the seat belt is not in use, the bulky buckle 20 can be fastened to the seatback 14. With this, undesired free movement of the bulky buckle 20 is suppressed.

However, the seat has the following drawbacks.

When, with the buckle 20 being fastened to the seatback 14, the seat occupant sits on the seat and inclines rearward to take a proper sitting position, his or her back is forced to abut against the bulky buckle 20 on the seatback 14. This causes him or her to feel uncomfortable.

Furthermore, due to the presence of the buckle 20 on the seatback 14, the external appearance of the seatback 14 is degraded.

SUMMARY OF THE INVENTION

Therefore, it is an object of the present invention to provide a seat assembly having a seat belt holding structure, which is free of the above-mentioned drawback.

According to the present invention, there is provided a seat having a seatback which includes a pad covered with an outer skin member, a seat belt assembly including a belt equipped with a buckle, first means for defining a recess in said pad, said recess being so sized as to accommodate said buckle, second means for providing said outer skin member with an openable part, said openable part permitting said recess to be exposed to the outside when opened, and third means for detachably fastening said openable part to said pad to cover said recess.

BRIEF DESCRIPTION OF THE DRAWINGS

Other objects and advantages of the present invention will become apparent from the following description when taken in conjunction with the accompanying drawings, in which:

FIG. 2 is a partial perspective view of the seat at a portion where the buckle holder is provided;

FIG. 3 is a perspective view of a pad used for the seatback of the seat;

FIG. 4 is a vertically sectional view of the seat at the portion where the buckle holder is provided.

DETAILED DESCRIPTION OF THE INVENTION

Referring to FIGS. 1 to 4, particularly FIG. 2, there is shown an automotive rear seat 10 having a seat belt buckle holder, according to the present invention.

Figure 1:
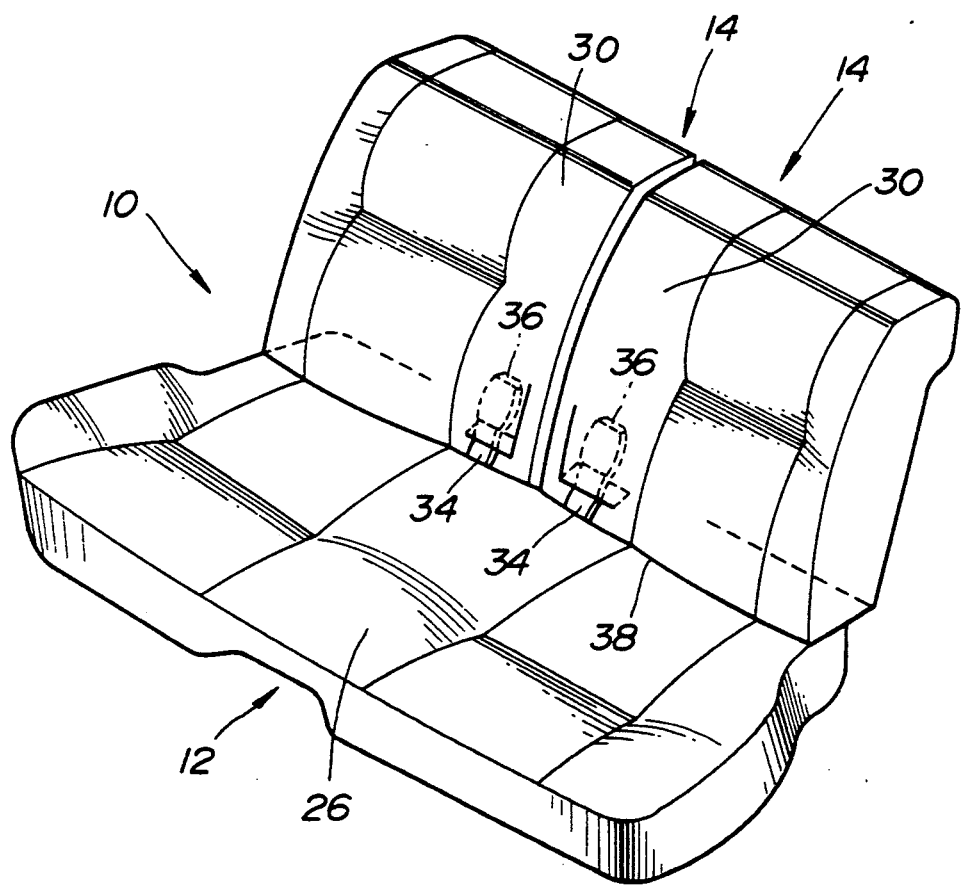
FIG. 1 is a perspective view of an automotive rear seat having a seat belt buckle holder, according to the present invention.
Figure 5:
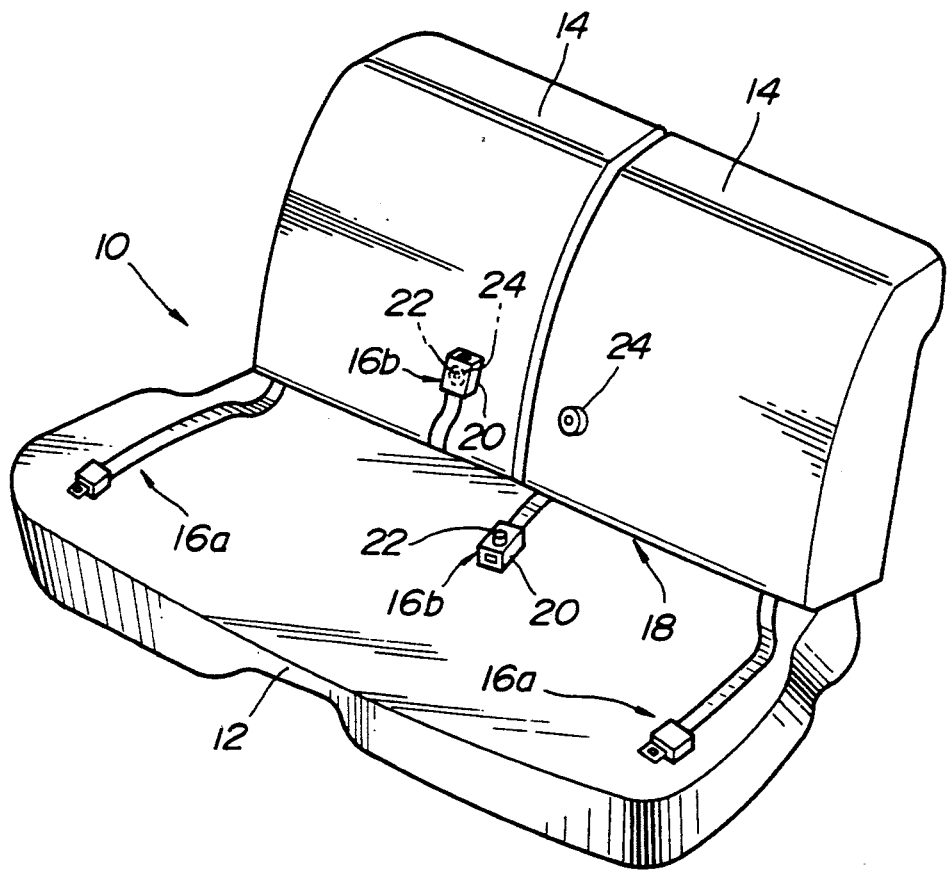
FIG. 5 is a view similar to FIG. 1, but showing a seat having a conventional buckle holder.

As is seen from FIG. 1, the rear seat 10 includes a seat cushion 12 and two abreast arranged seatbacks 14. At least one of the seatbacks 14 is forwardly inclinable.

The seat cushion 12 includes a seat cushion pad (not shown) which is entirely covered with an outer skin member 26.

As is understood from FIG. 2, each seatback 14 includes a seatback pad 28 which is substantially entirely covered with an outer skin member 30. The outer skin member 30 (or 26) includes an outer skin layer 31 lined with a wadding 32.

Referring back to FIG. 1, the rear seat 10 is equipped with two sets of seat belt assemblies. Each assembly includes a buckle-mounted belt part 34 and a tongue-mounted belt part (not shown).

The buckle-mounted belt part 34 has one end fixed to a vehicle floor (not shown) and the other end equipped with a buckle 36. The belt part 34 comes out to the front through the boundary portion between a rear upper end of the seat cushion 12 and a front lower end of the seatback 14, as shown.

As is seen from FIGS. 2 to 4, the pad 28 of each seatback 14 is partially cut away to form a rectangular recess 40. The recess 40 is so sized as to accommodate the buckle 36. In the illustrated embodiment, the recesses 40 of the two seatbacks 14 adjoin each other, as is understood from FIG. 1.

As is seen from FIG. 2, the outer skin member 30 is cut in an L-shape for providing the outer skin member 30 with an openable part 44. The openable part 44 which is monolithically united with the outer skin member 30 permits the rectangular recess 40 to be exposed to the outside when opened.

As is seen from FIG. 4, the inner wall of each recess 40 is lined with a flexible sheet 50 which is secured to the pad 28 by means of known fasteners 42.

The openable part 44 is lined with a protector member 46 which is made of a flexible plastic sheet or the like so as to reinforce the openable part 44. The flexible sheet 50 may be a part of the outer skin member 30.

Referring back to FIG. 2, paired elements 48a and 48b of a fastener are stuck on the edge portion of the back surface of the protector member 46 and the outside edge of the rectangular recess 40, respectively. The fastener is made of magnet, hook and eye tape and the like.

When the seat belt assembly is not in use, the buckle 36 of the seat belt assembly is put into the rectangular recess 40 of the seatback 14 by opening the openable part 44. When the buckle 36 is fully received in the recess 40, the openable part 44 is properly laid on the seatback 14 covering the recess 40. Under this condition, the paired elements 48a and 48b are detachably engaged.

Advantages given by the present invention will be described in the following.

When the seat belt assembly is not in use, the buckle 36 can be fully contained in the recess 40. Thus, the seat occupant can take his or her proper sitting position without interference of the buckle 36.

Furthermore, since the recess 40 is fully covered by the openable part 44 under such condition, the external appearance of the seat 10 is not lowered at all.

What is claimed is:

1. In a seat having a seatback which includes a pad covered with an outer skin member,
   a seat belt assembly including a belt equipped with a buckle;
   first means for defining a recess in said pad, said recess being so sized as to accommodate said buckle;
   second means for providing said outer skin member with an openable part, said openable part permitting said recess to be exposed to the outside when opened, said openable part cut from said outer skin member thereby forming a flap which is monolithically united with said outer skin member;
   third means for detachably fastening said openable part to said pad to cover said recess.

2. A seat as claimed in claim 1, in which said recess is rectangular in shape.

3. A seat as claimed in claim 2, in which said outer skin member is cut in L-shape to define said openable part.

4. A seat as claimed in claim 3, in which said recess is located at a lower front corner portion of said pad.

5. A seat as claimed in claim 4, in which said outer skin member includes an outer skin layer lined with a wadding.

6. A seat as claimed in claim 5, in which said openable part is lined with a protector member.

7. A seat as claimed in claim 6, in which said protector member is made of a flexible plastic sheet.

8. A seat as claimed in claim 7, in which said third means is a fastener made of magnet.

9. A seat as claimed in claim 7, in which said third means is a fastener made of hook and eye tape.

10. A seat as claimed in claim 9, in which the inner wall of said recess is lined with a flexible sheet.

* * * * *